US009111011B2

(12) United States Patent
Kogan et al.

(10) Patent No.: US 9,111,011 B2
(45) Date of Patent: Aug. 18, 2015

(54) LOCAL QUERY SUGGESTIONS

(71) Applicants: David Kogan, Natick, MA (US); Daniel G. Koulomzin, Jamaica Plain, MA (US)

(72) Inventors: David Kogan, Natick, MA (US); Daniel G. Koulomzin, Jamaica Plain, MA (US)

(73) Assignee: Google Inc., Mountain View, CA (US)

( * ) Notice: Subject to any disclaimer, the term of this patent is extended or adjusted under 35 U.S.C. 154(b) by 266 days.

(21) Appl. No.: 13/728,763

(22) Filed: Dec. 27, 2012

(65) Prior Publication Data

US 2015/0169605 A1 Jun. 18, 2015

Related U.S. Application Data

(60) Provisional application No. 61/735,492, filed on Dec. 10, 2012.

(51) Int. Cl.
*G06F 17/00* (2006.01)
*G06F 17/30* (2006.01)

(52) U.S. Cl.
CPC .................. *G06F 17/3097* (2013.01)

(58) Field of Classification Search
CPC ................... G06F 17/30864; G06F 17/30867; G06F 17/3097
See application file for complete search history.

(56) References Cited

U.S. PATENT DOCUMENTS

| 7,523,099 | B1* | 4/2009 | Egnor et al. ........................ 1/1 |
| 8,200,247 | B1 | 6/2012 | Starenky et al. |
| 8,396,888 | B2 | 3/2013 | Cheng et al. |
| 8,560,561 | B2 | 10/2013 | Govani et al. |
| 8,566,030 | B1* | 10/2013 | Demiryurek et al. ......... 701/426 |
| 2005/0027694 | A1* | 2/2005 | Sauermann ..................... 707/3 |
| 2008/0154876 | A1* | 6/2008 | Hao ................................ 707/5 |
| 2009/0005968 | A1* | 1/2009 | Vengroff et al. .............. 701/202 |
| 2009/0248626 | A1* | 10/2009 | Miller ............................. 707/3 |
| 2012/0047147 | A1* | 2/2012 | Redstone et al. ............. 707/748 |
| 2012/0265528 | A1 | 10/2012 | Gruber et al. |
| 2013/0311506 | A1 | 11/2013 | Taubman et al. |
| 2013/0326425 | A1* | 12/2013 | Forstall et al. ................ 715/851 |
| 2014/0025706 | A1 | 1/2014 | Barve et al. |
| 2014/0040274 | A1 | 2/2014 | Aravamudan et al. |
| 2014/0101600 | A1* | 4/2014 | Macbeth et al. .............. 715/780 |

FOREIGN PATENT DOCUMENTS

WO WO 2013/101490 7/2013

* cited by examiner

*Primary Examiner* — Tarek Chbouki
(74) *Attorney, Agent, or Firm* — Fish & Richardson P.C.

(57) ABSTRACT

Methods, systems, and apparatus, including computer programs encoded on computer storage media, for providing query suggestions. One of the methods includes receiving query log data that identifies a query and a location where the query was issued. A point of interest near the location where the query was issued is identified. A category of the point of interest near the location where the query was issued is identified. The query is associated with the category of the point of interest near the location where the query was issued.

24 Claims, 5 Drawing Sheets

LOCAL QUERY SUGGESTIONS

CROSS-REFERENCE TO RELATED APPLICATIONS

This application claims the benefit under 35 U.S.C. §119 (e) of the filing date of U.S. Provisional Patent Application No. 61/735,492, filed on Dec. 10, 2012, entitled "Local Query Suggestions," the entirety of which is herein incorporated by reference.

BACKGROUND

This specification describes technologies relating to search results processing.

The Internet provides access to a wide variety of resources, for example, video files, image files, audio files, or Web pages. Search engines are used to search these resources. For example, digital images that satisfy a user's informational need can be identified by a search engine in response to receiving a search query. The search queries are usually in the form of text, e.g., one or more query terms. The search system selects and scores resources based on their relevance to the search query and on their importance or quality relative to other resources and provides search results that link to the selected resources. The search results are typically ordered according to the scores and presented according to this order.

Search systems can also provide search query suggestions to users to help users satisfy their informational needs. As used herein, the term "query suggestion" is suggested data for a query that can be used to refine a search or refine a search strategy. Some search systems provide query suggestions in the form of a list of query suggestions as the user is typing a query. A user device typically sends inputs to a search system with each keystroke, and the search system provides the query suggestions with prefixes that match the entered characters. The user can select one of the query suggestions from the list without having to type the entire query suggestion. Once received, the user device displays these suggestions for user selection.

SUMMARY

This specification describes a system that can provide query suggestions based on a category associated with a location where the query was issued. The system can associate categories with received queries based on points of interest ("POI") near locations where the queries were issued. Such a POI may be, for example, a store, a museum, a tourist attraction, a park, a government building, or another entity at a particular geographic location. The system can aggregate a category-specific query count for a query received multiple times from multiple locations associated with the category, potentially from across a wide geographic region. The system can then use received queries associated with a category to provide query suggestions when a query prefix is issued from a location associated with the same category.

In general, one innovative aspect of the subject matter described in this specification can be embodied in methods that include the actions of receiving query log data that identifies a query and a location where the query was issued; identifying a point of interest near the location where the query was issued; determining a category of the point of interest near the location where the query was issued; and associating the query with the category of the point of interest near the location where the query was issued. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Identifying a point of interest near the location where the query was issued comprises identifying a point of interest within a threshold distance of the location where the query was issued. The actions include determining a second category of a second point of interest near the location where the query was issued; and associating the query with the second category. Identifying a point of interest near the location where the query was issued comprises identifying a grid cell for the location where the query was issued, wherein the grid cell is one of a plurality of grid cells that partition a geographic region; identifying a point of interest located within the grid cell; and determining a category of the point of interest located within the grid cell. The actions include determining a category-specific query count for the query and the category. Determining a category-specific query count for the query and the category comprises determining a number of times each instance of the query was issued from a respective location of the determined category. The actions include determining a score for the query based at least in part on the category-specific query count for the query and the category; ranking queries based at least in part on respective scores. The actions include determining an overall frequency for the query; determining a category-specific frequency for the query based on the category-specific query count; comparing the overall frequency for the query to the category-specific frequency for the query; and determining a score for the query based on comparing the overall frequency for the query to the category-specific frequency for the query. The actions include receiving a query prefix; determining a location where the query prefix was issued; identifying a second point of interest near the second location where the query prefix was issued; determining a second category of the second point of interest near the second location where the query prefix was issued; identifying one or more queries associated with the second category of the second point of interest near the second location where the query prefix was issued; and providing one or more terms of the identified one or more queries as query suggestions for the query prefix.

In general, another innovative aspect of the subject matter described in this specification can be embodied in methods that include the actions of receiving a query prefix; determining a location where the query prefix was issued; identifying a point of interest near the location where the query prefix was issued; determining a category of the point of interest near the location where the query prefix was issued; identifying a query associated with the category of the point of interest near the location where the query prefix was issued; and providing one or more terms of the identified query as a query suggestion for the query prefix. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. Identifying a point of interest near the location where the query prefix was issued comprises identifying a point of interest within a threshold distance of the location where the query prefix was issued. Identifying a point of interest near the location where the query prefix was issued comprises identifying a grid cell for the location where the query prefix was issued, wherein the grid cell is one of a plurality of grid cells that partition a geographic region; identifying a point of interest located within the grid cell; and determining a category of the point of interest located within the grid cell. The actions include determining a second category of a second point of interest near the location where the query prefix was issued; identifying a second query associated with the second category of the second point of interest near the location where the query prefix was issued; and providing one or more terms of the identified second query as a query suggestion for the query prefix. The actions include computing a combined query count for a query for the first category and the second category including summing a first query count for the first category and a second query count for the second category; and ranking one or more queries identified for the category and one or more second queries identified for the second category based at least in part on respective combined query counts for the first category and the second category. The actions include determining an overall frequency for the query; determining a category-specific frequency for the query based on a category-specific query count for the query and the category; comparing the overall frequency for the query to the category-specific frequency for the query; and determining a score for the query based on comparing the overall frequency for the query to the category-specific frequency for the query. The actions include computing a multiplier M including dividing the category-specific frequency for the query by the overall frequency for the query, wherein determining a score for the query based on comparing the overall frequency for the query to the category specific frequency for the query comprises computing a new score S' in place of a previous score S, wherein S' is given by S×M.

Particular embodiments of the subject matter described in this specification can be implemented so as to realize one or more of the following advantages. By considering categories associated with locations where queries were issued, a search system can provide query suggestions that are more likely to result in users finding resources that satisfy their informational need. Providing location-relevant query suggestions can also save users time by reducing the need to enter long queries. The query suggestions can also help users formulate queries that match their need and can provide other queries that the user would find interesting or useful.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
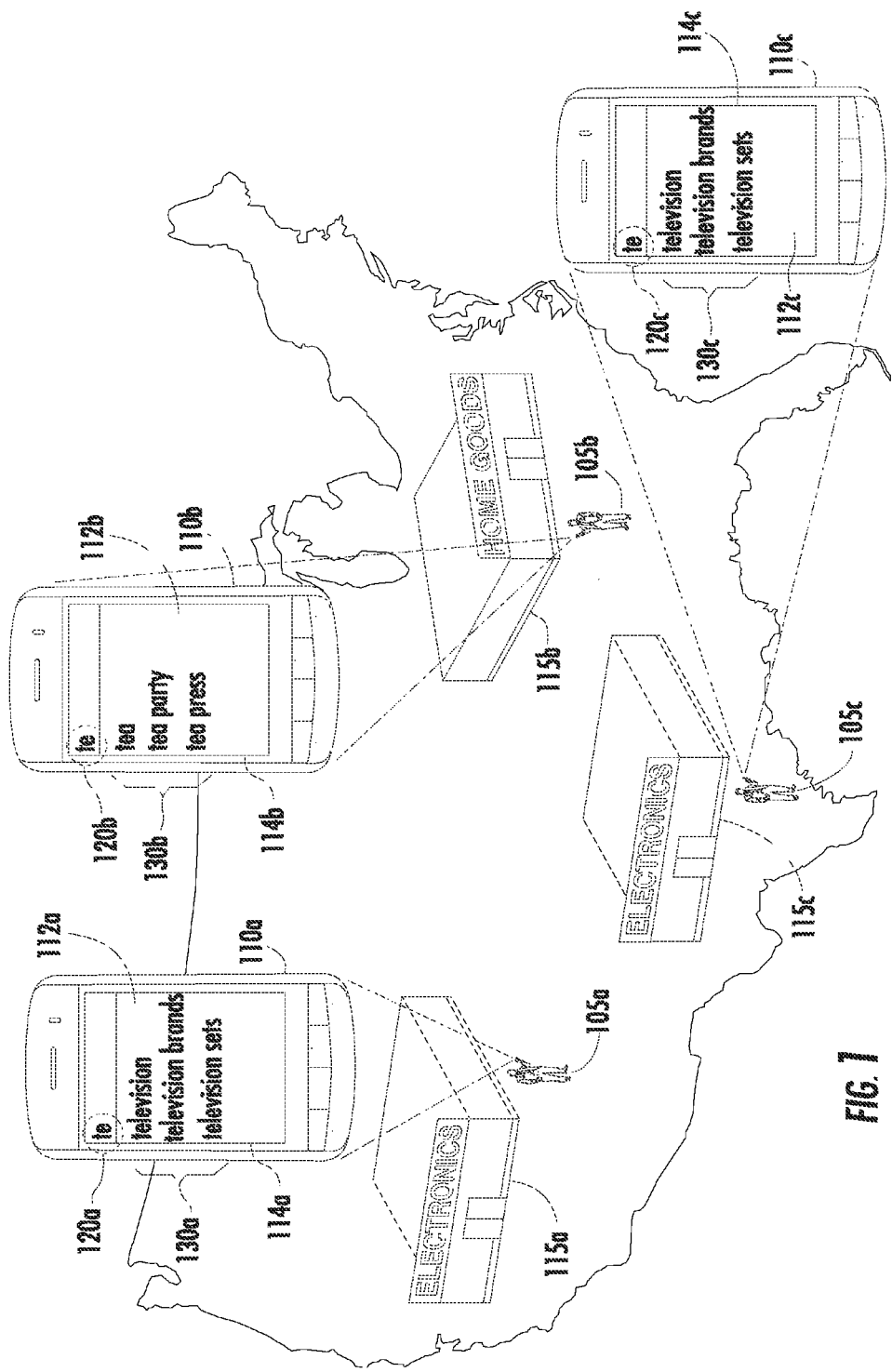
FIG. 1 is a diagram that illustrates providing query suggestions based on location categories.

FIG. 1 is a diagram that illustrates providing query suggestions based on location categories. In general, users 105a-c submit query prefixes using user devices 110a-c. In response, a search system can provide query suggestions based on a category associated with the location where each query prefix was issued.

FIG. 1 shows three retail stores that are in three different locations 115a-c. Stores at locations 115a and 115c are electronics stores. The store at location 115b is a home goods store. Users 105a-c are inside the stores and are using respective user devices 110a-c.

A user device 110 may be a mobile phone, a laptop computer, a PDA (Personal Digital Assistant), a smart phone, a Blackberry™ or another handheld or mobile device. The user device 110 includes hardware, such as a GPS receiver, a camera, an accelerometer or a compass, which is used to determine the current location of the mobile device 101. An application executing on the mobile device 110 generates a user interface 112 that is shown on a display 114 of the mobile device 110, which a user can use to submit search queries to a search system.

In FIG. 1, each user has entered one or more characters of a query into a user interface 112 on the user device, e.g. the user interface of a web browser. The user device 110 can transmit the one or more characters of the query, a "query prefix," to a search system, and in response, the search system can provide one or more query suggestions. For example, query suggestions 130a-c are provided in response to the entered query prefix "te" 120.

In selecting query suggestions for a received query prefix, a search system can consider a category associated with a location of a user. For example, users 105a and 105c are located near or in electronics stores. Thus, a search system can provide query suggestions associated with an electronics store category, e.g. "electronics." Query suggestions 130a and 130c for query prefix "te," e.g. "television," "television brands," and "television set," are thus related to the category "electronics" associated with locations 115a and 115c. On the other hand, user 105b is located inside a home goods store. Thus, a search system can provide query suggestions associated with a home goods store category, e.g. "tea." Query suggestions 130b for the same query prefix "te," e.g. "tea," "tea party," and "tea press," are thus related to the category "tea" associated with location 115b.

After receiving the query suggestions 130, a user of a user device can select a query suggestion, which causes the user device to submit the query suggestion as a new query to the search system.

Figure 2:
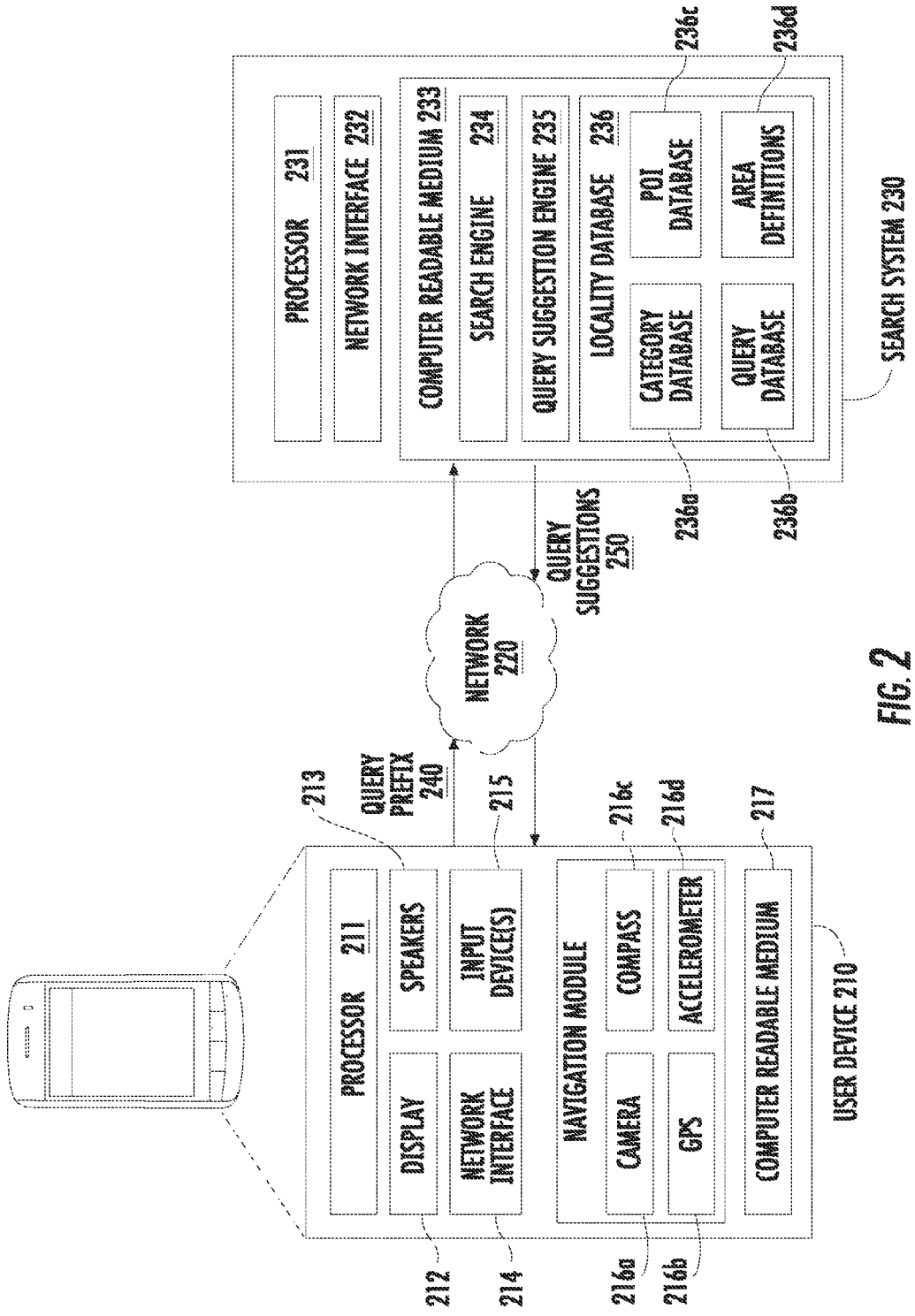
FIG. 2 is a block diagram of an example system for providing query suggestions.

FIG. 2 is a block diagram of an example system for providing query suggestions. The system illustrates a user device 210, a network 220, and a search system 230. A query prefix 240 is provided to the search system 230, and query suggestions 250 are provided to the user device 250.

The user device 210 includes one or more processors 211, a display 212, one or more speakers 213, one or more input devices 215, a network interface 214, a navigation module 216, and a medium 217. In another implementation, the user device 210 is not portable or mobile, but rather is a desktop computer or a server. In a further implementation, some of these structural elements are omitted or combined.

The display 212 may display video, graphics, images, and text that make up the user interface for the software applications used by the user device 210, and the operating system programs used to operate the user device 210. Among the possible elements that may be displayed on the display 212 are various indicators (e.g., new mail, active phone call, data transmit/send, signal strength, battery life) and application icons (e.g., web browser, phone application, search application, contacts application, mapping application, email application). In one example implementation, the display 212 is a quarter video graphics array (QVGA) thin film transistor (TFT) liquid crystal display (LCD), capable of 16-bit or better color.

The navigation module 216 includes a camera 216a, a GPS (Global Positioning Satellite) receiver 216b, a compass 216c, and an accelerometer 216d. The camera 216a allows the user device 210 to capture digital images, and may be a scanner, a digital still camera, a digital video camera, or other digital input device. In one example implementation, the camera 216a is a 3 megapixel (MP) or more camera that utilizes a complementary metal-oxide semiconductor (CMOS).

The GPS receiver 216b receives GPS signals in order to determine a current location. The compass 216c determines a direction pointed to by the user device 210. The one or more speakers 213 allow the user device 210 to convert an electrical signal into sound, such as a voice from another user generated by a telephone application program, or a ring tone generated from a ring tone application program. The accelerometer 216d may, for example, measure tilt, motion, or acceleration of the user device 210. The navigation module 216 may include other functionality, such as the ability to determine the location of the mobile device 210 using triangulation techniques based on WiFi signals and/or cellular tower signals.

The processor 211 processes operating system or application program computer instructions for the user device 210. The input devices 215 may include, for example, a keyboard. A keyboard may be used for entering text data and user commands into the user device 210.

The network 220 can include, for example, one or more of the Internet, a wireless local area network (WLAN) or WiFi network, a Third Generation (3G), Fourth Generation (4G), or other mobile telecommunications network, a wired Ethernet network, a private network such as an intranet, Wide Area Networks (WANs), Local Area Networks (LANs), analog or digital wired and wireless telephone networks, e.g., a PSTN, Integrated Services Digital Network (ISDN), and Digital Subscriber Line (xDSL), radio, television, cable, satellite, and/or any other delivery or tunneling mechanism for carrying data services, or any appropriate combination thereof. Networks may include multiple networks or subnetworks, each of which may include, for example, a wired or wireless data pathway.

The search system 230 may be connected to the network 220 and possibly to one or more other networks over the network interface 232. Similarly, the user device 210 may be connected to the network 220 and possibly to one or more other networks over the network interface 214.

The processor 231 processes operating system or application program computer instructions for the search system 230, and may be part of one or more computers in one or more locations that are coupled to each other through a network (e.g., network 220) implementing the search system 230.

The medium 233 stores and records information or data, and may be an optical storage medium, magnetic storage medium, flash memory, or any other storage medium type.

The medium 233 includes a search engine 234, a query suggestion engine 235, and a locality database 236.

The search engine 234 generates search results that it identifies as being responsive to a search query. The search engine 234 can identify search results for a query using an index database that stores indexed resources, e.g., web pages, images, or news articles on the Internet.

The locality database 236 includes one or more geographic area definitions 236d, and different types of databases, including a POI database 236c, a query database 236b, and a category database 236a. Geographic area definitions 236d may include area coordinates, area size, or other information. The POI database 236c may store associations between POIs and their associated locations, or geographic areas and POIs located within those geographic areas. The category database 236a may store associations between categories and queries. The query database 236b may store associations between queries and locations or geographic areas where the queries were issued.

The query suggestion engine 235 generates query suggestions 250 for a received query prefix 240. A query prefix 240 includes a portion of a search query, e.g. the first few characters or terms of a search query. In some implementations, the query suggestion engine 235 generates query suggestions that also start with the entered characters of the query prefix. In some other implementations, the query suggestion engine generates query suggestions such that the query prefix matches the query suggestions anywhere in the query. The query suggestion engine may also perform spelling correction or query revision techniques on query prefix 240 to generate matching query suggestions 250.

The query prefix 240 also includes location information, e.g. generated by navigation module 216 of user device 210. The location information identifies a location where the query prefix was issued. The location information can include latitude/longitude or other coordinates, a city and state, a ZIP code, or some combination thereof.

The query suggestion engine 235 can use location information in locality database 236 to generate query suggestions based on a category of a location where the query prefix 240 was issued. For example, the query suggestion engine 235 can aggregate all queries received from locations associated with a particular category and rank the queries by number of instances associated with the category. Then, when a query prefix 240 is received from a location associated with the particular category, the search system 230 can provide a number of highest ranked queries associated with the category as query suggestions 250.

While FIG. 2 illustrates on exemplary system for implementing the enhanced query suggestion techniques described by this specification, other exemplary systems are possible. For instance, one or more of the functionalities described in association with the search system 230, above, may actually be performed by the mobile device 210, and vice versa. Further, at least a portion of one or more of the modules, caches, databases and applications shown as being stored in medium 233 may actually be stored on the medium 217, and vice versa. Similarly, the user interface may be generated and displayed at the user device 210 using information received from the search system 230. Alternatively, the user interface may be generated at the search system 230, where the search system 230 transmits code (i.e., HTML code) that, when invoked by the user device 210, causes the user device 210 to display the user interface.

Figure 3:
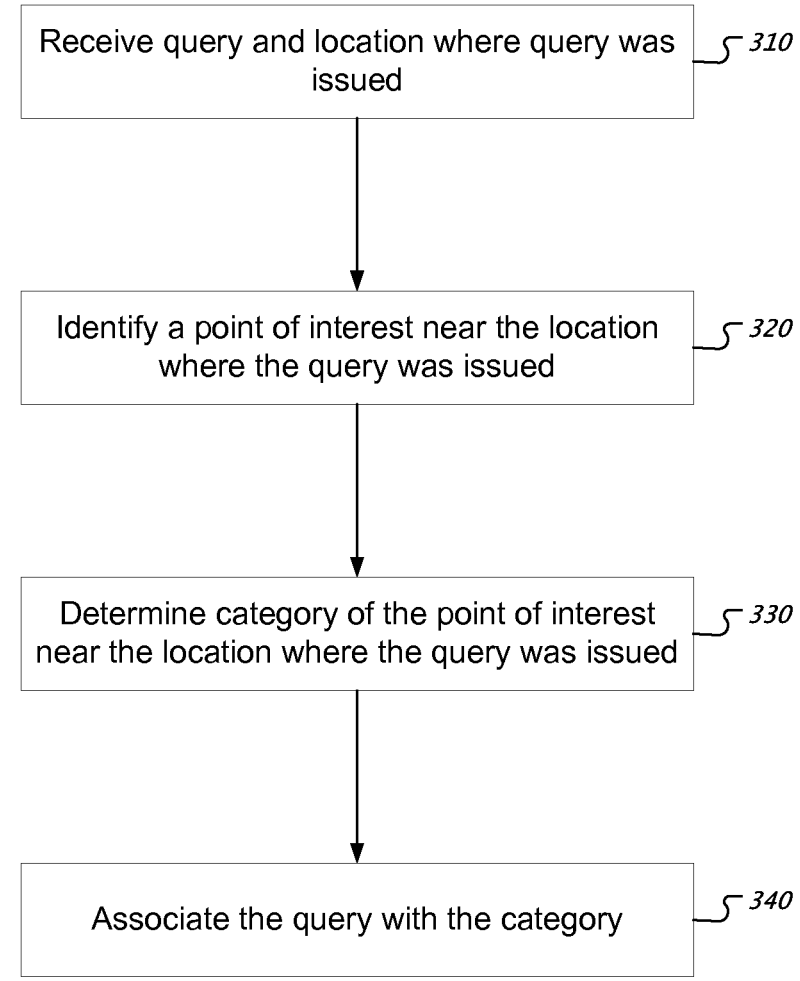
FIG. 3 is a flow chart of an example process for associating queries with categories.

FIG. 3 is a flow chart of an example process 300 for associating queries with categories. In general, the system receives a query from a location, determines a category of a point of interest near the location, and associates the query with the category. The system can then compute category-specific query statistics for each category that can be used to provide query suggestions. The process 300 can be implemented by one or more computer programs installed on one or more computers. The process 300 will be described as being performed by a system of one or more computers, e.g. the search system 230 of FIG. 2.

The system receives a query and a location where the query was issued (310). For example, the system can receive a query from a mobile device and location information provided by the mobile device that identifies a location where the query was issued. The system can also access data stored in a query database, e.g. query database 236b, that stores previously submitted queries and includes location information that indicates locations where the queries were issued.

The system identifies a point of interest near the location where the query was issued (320). The system can identify a point of interest that is within a threshold distance of the location where the query was issued. The system can also identify points of interest located in a same geographic area. The system can, for example, access geographic area definitions, e.g. stored as geographic area definitions 236d, that partition a portion of the Earth's surface into a number of grid cells of uniform or varying sizes, e.g. one mile square.

The system determines a category of the point of interest near the location where the query was issued (330). The category of the POI can be obtained, for example, from a POI database, e.g. POI database 236c, that stores associations between POIs and categories. For example, if query is received from a location near a POI that is an electronics store, the system can determine the category "electronics" for the location. The system can determine that a POI is near the location using a threshold distance, e.g. within 10 meters, 100 meters, or 1 kilometer.

In some implementations, the system identifies one or more POIs in a grid cell and associates the category of each POI with the grid cell. For example, if an electronics store is located within a particular grid cell, the system can associate the category of the electronics store "electronics," with the grid cell. Thereafter, the system can determine a category of "electronics" for locations within the grid cell.

Grid cells and POIs can be associated with multiple categories. For example, the system can determine multiple categories for a grid cell that includes multiple POIs of different categories, e.g. a grid cell that contains an electronics store and a hotel, or a single POI that is associated with multiple categories. For example, a store that sells both electronics and baby food can be associated with both an "electronics" category and a "baby supplies" category. Thus, the system can determine multiple categories for a location that is near or in the same grid cell as a single POI associated with multiple categories.

Similarly, a location may be near multiple POIs of different categories. For example, a location may be near an electronics store and also near a grocery store. Thus, the system can determine multiple categories for a location near multiple POIs of different categories.

The system associates the query with the category (340). After determining a category of the location where the query was issued, the system associates the query with the category. Thus, the system associates each category with one or more queries.

For each category, the system can then compute a category-specific query count for each distinct query. The category-specific query count will reflect a number of times each instance of the query was issued from a location associated with the category. For example, the category-specific query count for a query "television" and for the category "electronics" will reflect the number of times that the query was submitted from a location in or near an electronics store.

The system can rank queries associated with a category by the category-specific query count. The system can then designate a number of highest-ranked queries with a category as query suggestions for the category. The system can then provide a number of the highest-ranked queries in response to a query prefix received from a location associated with the category. Alternatively, the system can rank queries associated with a category using the category-specific query counts in an online fashion, in other words, after a query prefix is received.

In some implementations, the system uses the category-specific query counts to alter a ranking of general query suggestions when a query prefix is received near a location associated with a category. For example, a search system may have a baseline query suggestion framework that generates a ranking of queries to provide as query suggestions for a received query prefix. The system can rank the queries by associated scores, which can reflect, for example, measures of popularity or usefulness.

The system can use the category-specific query counts to modify the ranking of or to supplement the baseline query suggestions to take into account categories associated with received query prefixes. In some implementations, the system computes a multiplier and adjusts the score of a query suggestion for the category using the multiplier. For example, given a score S for a query suggestion and a multiplier M based on the category-specific query count, the system can compute and assign a new score S' in place of S by computing S×M. The effect of the multiplier on the score of the query suggestion can result in the rank of the query suggestion being promoted or demoted for a query prefix associated with the category.

In some implementations, the system computes the multiplier M by comparing an expected or overall frequency of a query to a category-specific query frequency that represents a frequency of the query for queries received near locations associated with the category. For example, the overall frequency of a particular query "television," may be 1 query in 10,000. If the category-specific frequency of the received query "television" for queries received from locations associated with the category "electronics" is more than, e.g. double, triple, or 100 times, the overall frequency, the system can compute a multiplier M that promotes the rank of the query suggestion "television" when provided for a query prefix submitted near a location associated with the "electronics" category. On the other hand, if the category-specific frequency of the received query when received from locations associated with the category "electronics" is less than, e.g. half, one tenth, or one hundredth, the overall query frequency, the system can compute a multiplier M that demotes the rank of the query suggestion "television" for a query prefix submitted near a location associated with the "electronics" category. In some implementations, the multiplier M is calculated as the frequency associated with the category $F_C$ divided by the expected or overall frequency of the query $F_E$, or $$M = \frac{F_C}{F_E}.$$

Figure 4:
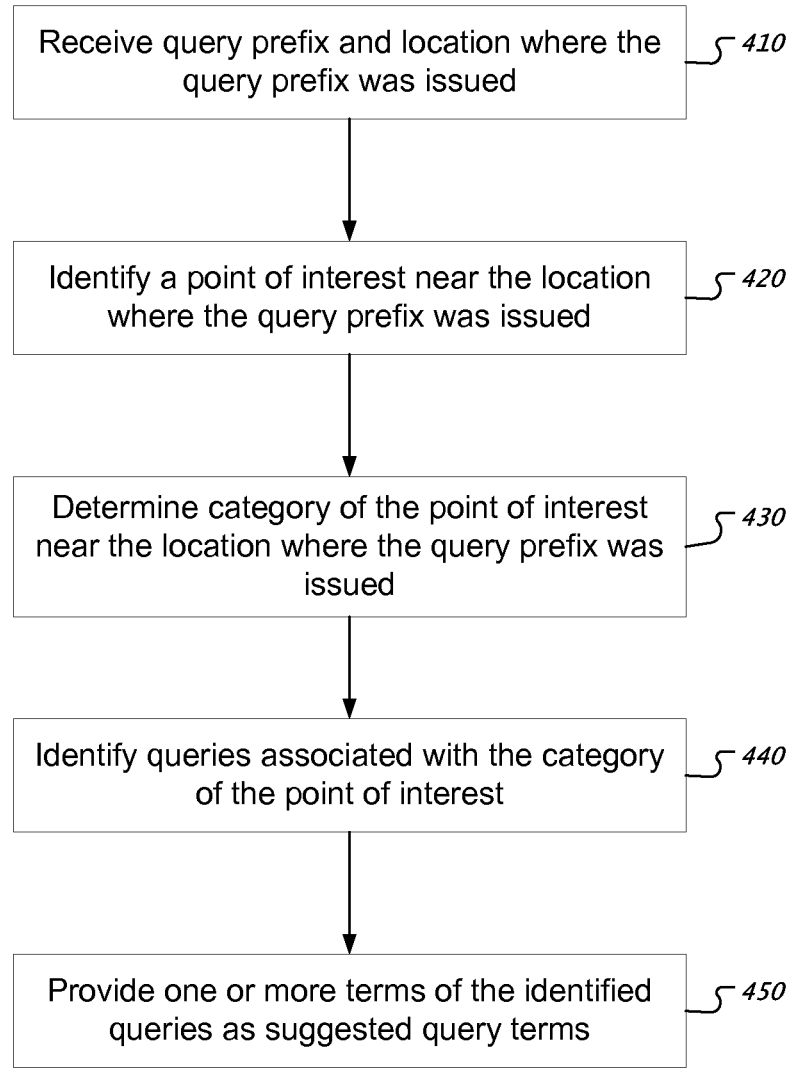
FIG. 4 is a flow chart of an example process for providing query suggestions.

FIG. 4 is a flow chart of an example process 400 for providing query suggestions. In general, the system receives a query prefix from a location and provides query suggestions using a category associated with the location. The process 400 can be implemented by one or more computer programs installed on one or more computers. The process 400 will be described as being performed by a system of one or more computers, e.g. the search system 230 of FIG. 2.

The system receives a query prefix and a location where the query prefix was issued (410). For example, a user can begin entering characters of a query through a user interface of a user device. After one or more characters have been entered, the user device can communicate over a network with the system by providing the query prefix. The system can receive the query from a mobile device and location information provided by the mobile device that identifies a location where the query was issued.

The system identifies a point of interest near the location where the query prefix was issued (420). As described above, the system can identify a POI within a threshold distance of the location where the query prefix was issued, or the system can identify a POI within a grid cell that also contains the location.

The system determines a category of the point of interest near the location where the query prefix was issued (430). The system can identify a category of the point of interest, for example, using a POI database.

The system identifies queries associated with the category of the point of the interest near the location where the query prefix was issued (440). After determining a category, the system can identify one or more queries associated with the category. The queries associated with the category can have an associated category-specific query count for the category. The system can rank the queries by the query count, either before or after receiving the query prefix.

In some implementations, the system first selects queries that match the query prefix, and then ranks only matching queries associated the category. For example, if the user has entered "te" as a query prefix, the system can select and rank only queries that also begin with "te" or that otherwise match the query prefix.

The system provides one or more terms of the identified queries as query suggestions (450). The system can select one or more queries associated with the category and provide terms of the queries as query suggestions. The system can provide all or a portion of the terms of a selected query as a query suggestion. After receiving a query suggestion, a user of a user device can then select the query suggestion to initiate the query suggestion as a new query.

Figure 5:
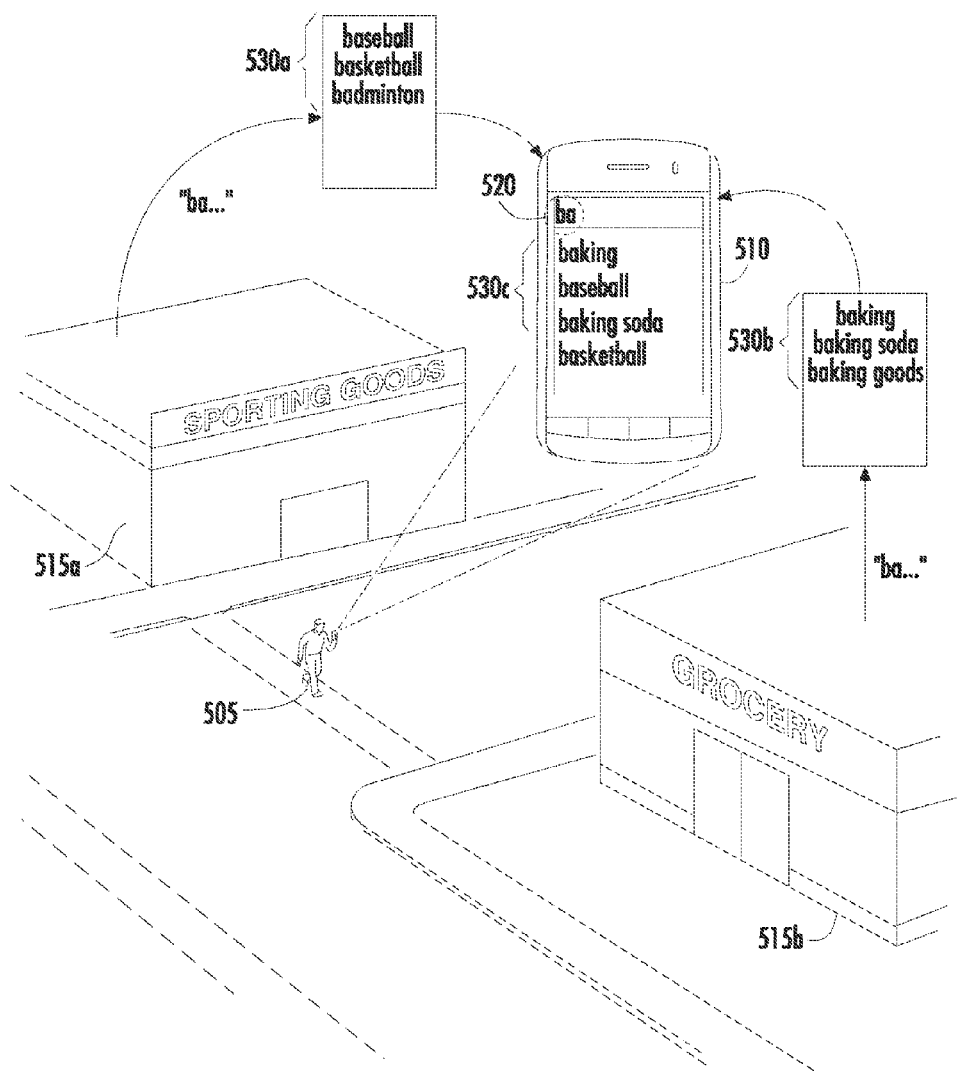
FIG. 5 illustrates providing query suggestions for locations associated with multiple categories.

In some situations, a user may be in a location that is associated with multiple categories. FIG. 5 illustrates providing query suggestions for locations associated with multiple categories. In FIG. 5, a user 505 is standing at a location between two stores, a sporting goods store at location 515a, and a grocery store at location 515b. The sporting goods store at location 515a is associated with the category "sports," and the grocery store at location 515b is associated with the category "baking."

For the user's location, the system can determine that the sporting goods store at location 515a and the grocery store at 515b are near the location of the user 505. Thus, the system can provide query suggestions associated with each of the "sports" and "baking" categories by blending together query suggestions of each category.

The user 505 has a mobile device 510 and has entered a query prefix 520, "ba." The system then uses the location of the user 505 to determine one or more categories. Because the user 505 is near two POIs 515a and 515b, the system can identify both categories associated with the POIs, "sports" and "baking."

For the category, "sports," the system can identify queries 530a, "baseball," "basketball," and "badminton," that match the query prefix "ba" and that are associated with the category "sports." For the category "baking," the system can identify queries 530b, "baking," "baking soda," and "baking goods," that match the query prefix "ba" and that are associated with the category "baking."

The system can then blend together the two sets of identified queries 530a and 530b to generate the combined query suggestions 530c. The system can rank queries in the combined query suggestions 530c in a number of ways. For example, the system can rank the combined query suggestions 530c by the category-specific query counts. The system can also compute and rank queries by a combined query count that reflects how often a query is received from locations associated with either category. In other words, a query that has an "electronics"-specific query count of 50 and a "grocery"-specific query count of 100 may have a combined query count of 150. The system can then provide one or more highest-ranked combined query suggestions 530c to the user device 510 for selection by the user 505.

The system can also use category-specific multipliers to rank queries in the combined query suggestions 530c. For example, the system can compute a new score S' for a query suggestion by applying multipliers for each category to an original score S. The system can also compute the new score S' by selecting and applying the largest multiplier of the multiple categories for the query prefix. The system can also compute an average of the multipliers and compute the new score S' by applying the average of the multipliers.

Some categories may be more important than other categories. In some implementations, the system can combine query suggestions from multiple categories by taking into consideration the relative importance of each category. The system can compute a measure of category importance, for example, by a number of received queries associated with the category, by a measure of query traffic generated for a particular category, by a manually-assigned measure of importance, or by some other measure. For example, the system can determine that the category "sporting goods" is more important than the category "grocery." This may reflect a trend that people tend to issue more queries from sporting goods stores than from grocery stores. Thus, when blending together query suggestions for a category, the system can give more weight to query suggestions associated with "sporting goods," the more important category.

For example, the system can use the category importance measure to compute a weighted average of the multipliers and then compute a new score S' using the weighted average of the multipliers. The system can also select and apply a multiplier of the most important category. Other ways of combining multipliers to account for category importance can also be used.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   responsive to obtaining a first query including one or more characters and a first user location where the first query was issued:
      identifying a first point of interest within a first predefined proximity to the first user location;
      identifying a second point of interest within a second predefined proximity to the first user location;
      determining a first category of the first point of interest and a second category of the second point of interest;
      identifying, using a database that maps categories to queries issued by users at locations within predefined proximities to points of interest having the first category, a first category-specific query suggestion in accordance with the first category and a second category-specific query suggest in accordance with the second category, including:
         determining a first category-specific count representing a total number of times the first query was issued by users from user locations having the first category;
         determining a second category-specific count representing a total number of times the first query was issued by users from user locations having the second category; and
         providing the first category-specific query suggestion in accordance with the first category-specific count and the second category-specific query suggestion in accordance with the second category-specific count,
         wherein the first category-specific query suggestion includes the one or more characters included in the first query, and the second category-specific query suggestion includes the one or more characters included in the first query; and
      providing, to a user, one or more query suggestions including the first category-specific query suggestion and the second category-specific query suggestion.

2. The method of claim 1, wherein a predefined proximity specifies a threshold distance between a user location where a query is issued and a point of interest.

3. The method of claim 1, further comprising:
   determining a first overall count representing a total number of times the first query was issued by users; and
   providing the first category-specific query suggestion in accordance with the first overall count.

4. The method of claim 3, wherein providing the first category-specific query suggestion in accordance with the first overall count comprises:
   ranking the first category-specific query suggestion within the two query suggestions in accordance with the first overall count.

5. The method of claim 1, wherein providing the first category-specific query suggestion in accordance with the first category-specific count comprises:
   ranking the first category-specific query suggestion within the two query suggestions in accordance with the first category-specific count.

6. The method of claim 1, wherein determining a first category of the first point of interest comprises:
   identifying the first category in accordance with a database that maps points of interest to categories.

7. The method of claim 1, further comprising:
   identifying the first query as a query prefix; and
   providing, to the user, the first category-specific query suggestion as a complete query including the query prefix issued.

8. A system comprising:
   one or more computers and one or more storage devices storing instructions that are operable, when executed by the one or more computers, to cause the one or more computers to perform operations comprising:
   responsive to obtaining a first query including one or more characters and a first user location where the first query was issued:
      identifying a first point of interest within a first predefined proximity to the first user location;
      identifying a second point of interest within a second predefined proximity to the first user location;
      determining a first category of the first point of interest and a second category of the second point of interest;
      identifying, using a database that maps categories to queries issued by users at locations within predefined proximities to points of interest having the first category, a first category-specific query suggestion in accordance with the first category and a second category-specific query suggest in accordance with the second category, including:
         determining a first category-specific count representing a total number of times the first query was issued by users from user locations having the first category;
         determining a second category-specific count representing a total number of times the first query was issued by users from user locations having the second category; and
         providing the first category-specific query suggestion in accordance with the first category-specific count and the second category-specific query suggestion in accordance with the second category-specific count, wherein the first category-specific query suggestion includes the one or more characters included in the first query, and the second category-specific query suggestion includes the one or more characters included in the first query; and providing, to a user, one or more query suggestions including the first category-specific query suggestion and the second category-specific query suggestion.

9. The system of claim 8, wherein a predefined proximity specifies a threshold distance between a user location where a query is issued and a point of interest.

10. The system of claim 8, the operations further comprising:

determining a first overall count representing a total number of times the first query was issued by users; and providing the first category-specific query suggestion in accordance with the first overall count.

11. The system of claim 10, wherein providing the first category-specific query suggestion in accordance with the first overall count comprises:

ranking the first category-specific query suggestion within the two query suggestions in accordance with the first overall count.

12. The system of claim 8, wherein providing the first category-specific query suggestion in accordance with the first category-specific count comprises:

ranking the first category-specific query suggestion within the two query suggestions in accordance with the first category-specific count.

13. The system of claim 8, wherein determining a first category of the first point of interest comprises: identifying the first category in accordance with a database that maps points of interest to categories.

14. The system of claim 8, wherein the operations further comprise:

identifying the first query as a query prefix; and providing, to the user, the first category-specific query suggestion as a complete query including the query prefix issued.

15. A computer-implemented method comprising:

responsive to receiving a query prefix from a user;

determining a user location where the query prefix was issued;

identifying a first point of interest within a first predefined proximity to the user location;

identifying a second point of interest within a second predefined proximity to the user location;

determining a first category of the first point of interest;

determining a second category of the first point of interest;

identifying, using a database that maps categories to queries issued by users at locations within predefined proximities to points of interest having the first category, a first category-specific query in accordance with the first category and a second category-specific query in accordance with the second category, including:

determining a first category-specific count representing a total number of times the query prefix was issued by users from user locations having the first category;

determining a second category-specific count representing a total number of times the query prefix was issued by users from user locations having the second category; and providing a first category-specific query in accordance with the first category-specific count and a second category-specific query in accordance with the second category-specific count, wherein the first category-specific query includes the query prefix and the second category-specific query includes the query prefix; and providing, to the user, one or more queries including the first category-specific query and the second category-specific query as query suggestions for the query prefix.

16. The method of claim 15, wherein a predefined proximity specifies a threshold distance between a user location where a query prefix is issued and a point of interest.

17. The method of claim 15, further comprising:

determining a first category-specific count representing a total number of times the query prefix was issued by users from user locations having the first category; and providing the first category-specific query suggestion in accordance with the first category-specific count.

18. The method of claim 17, wherein the one or more queries include two queries, and providing the first category-specific query suggestion in accordance with the first category-specific count comprises:

ranking the first category-specific query within the two queries in accordance with the first category-specific count.

19. The method of claim 15, wherein determining a first category of the first point of interest comprises:

identifying the first category in accordance with a database that maps points of interest to categories.

20. A system comprising:

one or more computers and one or more storage devices storing instructions that are operable, when executed by the one or more computers, to cause the one or more computers to perform operations comprising responsive to receiving a query prefix from a user;

determining a user location where the query prefix was issued;

identifying a first point of interest within a first predefined proximity to the user location;

identifying a second point of interest within a second predefined proximity to the user location;

determining a first category of the first point of interest;

determining a second category of the first point of interest;

identifying, using a database that maps categories to queries issued by users at locations within predefined proximities to points of interest having the first category, a first category-specific query in accordance with the first category and a second category-specific query in accordance with the second category, including:

determining a first category-specific count representing a total number of times the query prefix was issued by users from user locations having the first category;

determining a second category-specific count representing a total number of times the query prefix was issued by users from user locations having the second category; and providing a first category-specific query in accordance with the first category-specific count and a second category-specific query in accordance with the second category-specific count, wherein the first category-specific query includes the query prefix and the second category-specific query includes the query prefix; and providing, to the user, one or more queries including the first category-specific query and the second category-specific query as query suggestions for the query prefix.

21. The system of claim 20, wherein a predefined proximity specifies a threshold distance between a user location where a query prefix is issued and a point of interest.

22. The system of claim 20, wherein the operations further comprise:

determining a first category-specific count representing a total number of times the query prefix was issued by users from user locations having the first category; and providing the first category-specific query suggestion in accordance with the first category-specific count.

23. The system of claim 22, wherein the one or more queries include two queries, and providing the first category-specific query suggestion in accordance with the first category-specific count comprises:

ranking the first category-specific query within the two queries in accordance with the first category-specific count.

24. The system of claim 20, wherein determining a first category of the first point of interest comprises:

identifying the first category in accordance with a database that maps points of interest to categories.

* * * * *